(12) United States Patent
Lin et al.

(10) Patent No.: US 7,976,703 B2
(45) Date of Patent: Jul. 12, 2011

(54) TREATING UNIT FOR SIMULTANEOUS REMOVAL OF CARBON AND NITROGEN FROM WASTEWATER AND TREATING APPARATUS HAVING THE SAME

(76) Inventors: Cheng-Fang Lin, Taipei (TW); Ping-Yi Yang, Taipei (TW); Karen Lin, Taipei (TW)

( * ) Notice: Subject to any disclaimer, the term of this patent is extended or adjusted under 35 U.S.C. 154(b) by 170 days.

(21) Appl. No.: 12/435,814

(22) Filed: May 5, 2009

(65) Prior Publication Data
US 2009/0277819 A1    Nov. 12, 2009

(30) Foreign Application Priority Data

May 6, 2008   (TW) .............................. 97116607 A
Apr. 30, 2009  (TW) .............................. 98114342 A

(51) Int. Cl.
*C02F 3/10* (2006.01)
(52) U.S. Cl. ........ 210/150; 210/151; 210/617; 210/903; 261/DIG. 72
(58) Field of Classification Search .................. 210/150, 210/151, 257.2, 259, 616, 617, 903; 261/DIG. 72
See application file for complete search history.

(56) References Cited

U.S. PATENT DOCUMENTS

| | | | | |
|---|---|---|---|---|
| 4,724,593 A | * | 2/1988 | Lang ...................... | 261/DIG. 72 |
| 4,786,413 A | * | 11/1988 | Reimann et al. ............. | 210/616 |
| 4,810,377 A | * | 3/1989 | Kato et al. .................... | 210/150 |
| 4,842,920 A | * | 6/1989 | Banai et al. ................... | 210/150 |
| 5,202,027 A | * | 4/1993 | Stuth ............................ | 210/615 |
| 5,223,129 A | * | 6/1993 | Hsieh ........................... | 210/150 |
| 5,690,819 A | * | 11/1997 | Chianh ......................... | 210/150 |
| 5,932,099 A | * | 8/1999 | Cote et al. .................... | 210/151 |
| 6,007,712 A | * | 12/1999 | Tanaka et al. ................ | 210/151 |
| 6,126,829 A | * | 10/2000 | Gunnarsson et al. ......... | 210/150 |
| 6,524,849 B1 | * | 2/2003 | Adams et al. ................ | 210/150 |
| 6,811,702 B2 | * | 11/2004 | Verstraete et al. ............ | 210/151 |
| 6,926,830 B2 | * | 8/2005 | Ho et al. ....................... | 210/150 |
| 6,982,037 B2 | * | 1/2006 | Horng et al. .................. | 210/151 |
| 7,288,197 B2 | * | 10/2007 | Shao et al. .................... | 210/151 |
| 2006/0096919 A1 | * | 5/2006 | Han et al. ..................... | 210/617 |
| 2007/0205152 A1 | * | 9/2007 | Jell et al. ...................... | 210/616 |

FOREIGN PATENT DOCUMENTS

WO     WO 98/11026     *  3/1998

* cited by examiner

*Primary Examiner* — Christopher Upton
(74) *Attorney, Agent, or Firm* — Birch, Stewart, Kolasch & Birch, LLP

(57) ABSTRACT

The present invention provides a treating unit of activated sludge for wastewater treatment and a treating apparatus having the same. The treating unit is constructed by a cage-shaped supporting structure which defines an interior space for containing the microbial cell therein. The present invention provides a measure for simultaneous removal of organics and nitrogen compounds from the wastewater under a condition of controlled aeration, and makes the configuration of treating apparatus as well as the treating process more simplified. It is also an alternative to replace the traditional A2O process. According to the present invention, the design of sludge return, which is essential for the conventional activated sludge treatment, is not needed. Moreover, the present invention is compatible with the conventional activated sludge treatment process and is advantageous in its short start-up period during which a stable operation is achievable.

25 Claims, 11 Drawing Sheets

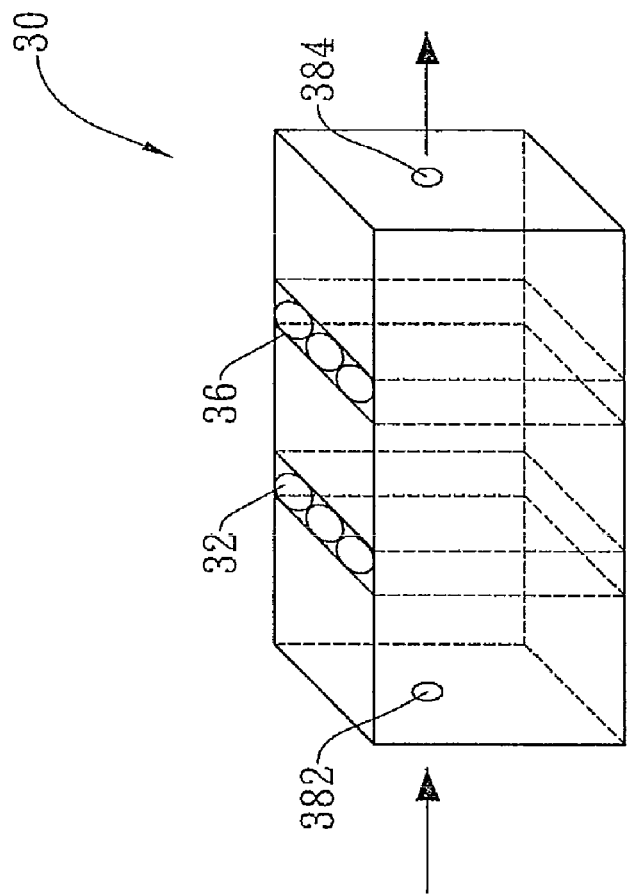
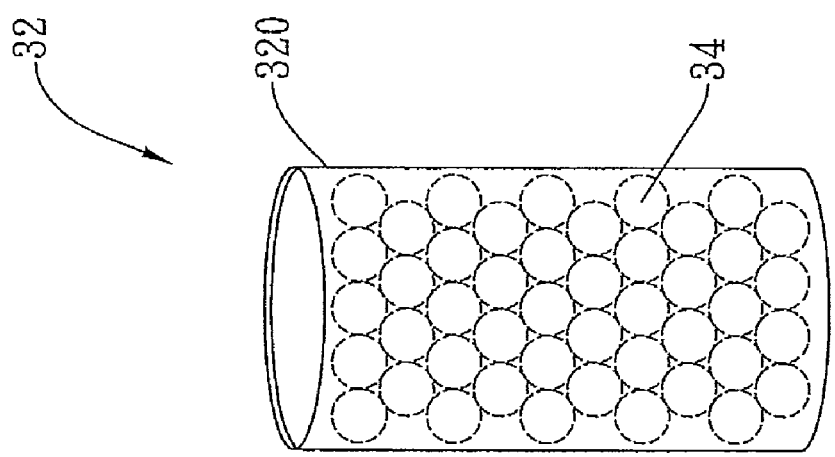
Fig. 3B
Fig. 3A

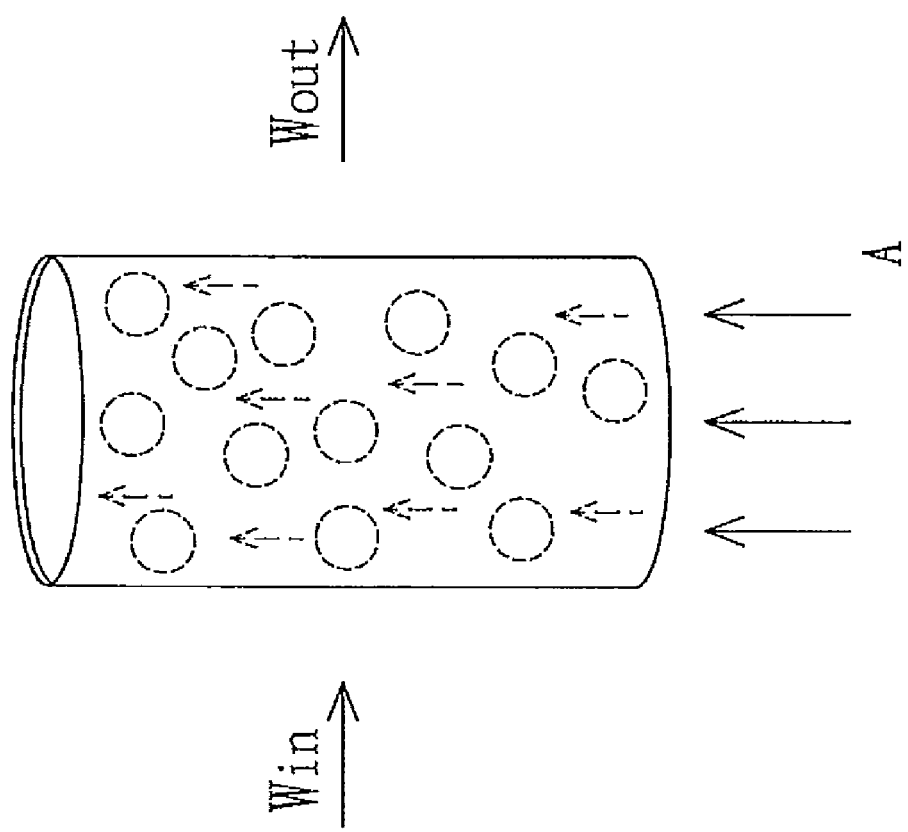

TREATING UNIT FOR SIMULTANEOUS REMOVAL OF CARBON AND NITROGEN FROM WASTEWATER AND TREATING APPARATUS HAVING THE SAME

BACKGROUND OF THE INVENTION

1. Field of the Invention

The present invention relates to a biological treatment apparatus for wastewater, and more particularly to a biological treatment apparatus for wastewater adopting the activated sludge process.

2. Description of the Related Art

Biological treatment is a secondary procedure of wastewater treatment, which is typically employed for the wastewater being primarily treated. The wastewater from the primary sedimentation tank is biologically treated and settled, and then discharged. The organics contained in the wastewater is degraded by means of biological metabolism, so as to remove the organics (the so-called biochemical oxygen demand, BOD, and chemical oxygen demand, COD) as well as nitrogen compounds and phosphorous compounds therefrom.

Typically, the biological treatment is classified into such as aerobic treatment and anaerobic treatment. The aerobic treatment is carried out to remove the organic carbon from the wastewater and to make the organic nitrogen and ammonia nitrogen bio-oxidize into nitrates. The removal of nitrates from wastewater is carried out by means of anaerobic treatment, which is so-called as denitrification. The microbes employed in biological treatment are consisting of bacteria, fungus, algae and protozoa, where the community thereof shall be well-acclimated for various kinds of wastewater to be treated and substances to be removed. It is so difficult to well-control the treatment efficiency, since the treatment efficiency is highly depending upon the community of microbes and treating condition. In this case, the operation of such process is much complicated and needs technicality.

In an activated sludge process, which is one kind of aerobic treatment, wastewater being primarily treated is directed into an aeration tank to contact and mix with the activated sludge therein, and is subsequently directed therefrom into a settlement tank for sludge separation. A portion of the separated sludge is returned into the aeration tank (i.e. the returned sludge) while the remaining portion thereof is discharged to be further processed (i.e. subjected to the so-called sludge treatment and disposal). In addition to the difficulty in acclimation of microbial community, it needs to precisely control a variety of factors and conditions, such as the retention time, the return ratio of sludge, the aeration condition . . . etc. for the activated sludge process, so as to optimize the operation condition and achieve an improved efficiency.

Typically, the activated sludge composed of suspended aerobic microbial community is easily peeling off, which may cause the concentration of suspended solids of water and thus the loading of the activated sludge process to significantly increase. Moreover, the peeling-off of microbial aggregation also makes the control of operation condition of such process much difficult.

Due to the selectivity nature of biological degradation, it is necessary for the biological treatment to adopt multiple stages of sludge return and wastewater return for controlling the anoxic mode, anaerobic mode and aerobic mode in different reactors or tanks, so as to carry out the nitrification of ammonia nitrogen and removal of organic carbons (e.g. BOD and COD) under the aerobic condition, to carry out the denitrification and removal of nitrate nitrogen under the anaerobic condition. Such process is also termed as an A2O process, which is complicated, land-consuming, and cost-inefficient.

On the other hand, the membrane separation process is commonly used in treating the industrial wastewater and municipal wastewater. Some membrane modules, such as microfiltration (MF) modules, are capable of being combined with the biological treatment for the bio-sludge separation in a membrane bioreactor (MBR), so as to obtain the effluent of good quality. Nevertheless, the suspended solids caused by the peeling-off of microbial aggregation as well as the adsorption of sludge floe onto the membrane may result in the membrane fouling, and hence the membrane needs to be frequently replaced or cleaned. Accordingly, such process is not cost-efficient and needs to be improved.

SUMMARY OF THE INVENTION

It is a first aspect of the present invention to provide a fixable treating unit of activated sludge, which is applicable in a wastewater treatment reactor and capable of eliminating the peeling of microbial aggregations.

It is a second aspect of the present invention to provide a biological treatment apparatus capable of removing the organics and nitrogen compounds from wastewater under a controlled operation condition.

It is a third aspect of the present invention to provide a biological treatment apparatus in which the design of sludge return is not needed.

It is a fourth aspect of the present invention to provide a biological treatment apparatus, whose operation is stabilized in a short period.

It is a fifth aspect of the present invention to provide a wastewater treatment system capable of removing the organics, nitrogen compounds and suspended solids from wastewater under a controlled aeration mode.

It is a sixth aspect of the present invention to provide a wastewater treatment system, in which the efficiency of membrane treatment is enhanced and the expense thereof is reduced.

In accordance with the mentioned aspects, a treating unit for simultaneously removing organics and nitrogen compounds from wastewater is provided. The provided treating unit includes a microbial cell containing conditioned activated sludge and a supporting device constructed by at least two rings located on different planes and having an interior space defined thereby, where the microbial cell is contained in the interior space.

Preferably, the microbial cell has a solid content of activated sludge ranged from 10% to 20%.

Preferably, each of the rings is made of a thermoplastic material such as polyethylene (PE).

Preferably, the supporting device is cage-shaped or sphere-shaped.

Preferably, the supporting device is constructed by three rings located on different planes.

Preferably, the rings are adhered and fixed to each other by means of thermal melting or other methods.

Preferably, the inner diameter of the ring is ranged from 5 mm to 30 mm.

Preferably, the inner diameter of the ring is 25 mm.
Preferably, the inner diameter of the ring is 16 mm.
Preferably, the inner diameter of the ring is 10 mm.

In accordance with the mentioned aspects, a biological treatment apparatus for simultaneously removing organics and nitrogen compounds from wastewater is provided. The provided biological treatment apparatus includes a biological reactor containing plural treating units filled therein, and is characterized by that each of the treating units is constructed by a supporting cage and a microbial cell contained in the supporting cage.

Preferably, the supporting cage is constructed by at least two rings located on different planes.

Preferably, the supporting cage is a sphere-shaped cage constructed by three rings located on different planes.

Preferably, the biological reactor is one of a columnar reactor, a rectangular reactor and a fluidized bed.

In accordance with the mentioned aspects, a wastewater treatment apparatus including a reactor having plural biological treating units contained therein is provided. The provided wastewater treatment apparatus is characterized by that each of the biological treating units includes a supporting device defining an interior space and a microbial cell contained in the interior space, by which a simultaneous removal of organics and nitrogen compounds from wastewater is carried out under a controlled aeration mode such as a continuous mode or an on/off aeration mode.

Preferably, the reactor has a volume filling ratio of the biological treating units of 30% substantially.

In accordance with the mentioned aspects, a wastewater treatment is provided. The provided wastewater treatment system includes a biological reactor having a plurality of treating units therein, each of the treating units being formed by a microbial cell and supporting cage containing the microbial cell therein; and a membrane reactor having at least one membrane therein, where the inlet of the membrane reactor is fluidly connected to the outlet of the biological reactor.

Preferably, the biological reactor is one of a columnar reactor and a rectangular reactor.

Preferably, the rectangular reactor includes at least one treating case containing the treating units.

In accordance with the mentioned aspects, a treating apparatus for simultaneously removing organics, nitrogen compounds and suspended solids from wastewater is provided. The provided treating apparatus includes a reactor containing the wastewater to be treated therein; a plurality of treating units distributed in the wastewater within the reactor, each of the treating units being formed by a microbial cell and a supporting cage containing the microbial cell therein; and at least one membrane module configured in the reactor and dipped in the wastewater, wherein the organics and nitrogen compounds are removed from said wastewater by said treating units under a controlled aeration mode, and wherein the suspended solids are filtered from the wastewater by the at least one membrane module.

Preferably, the treating units are fluidizedly distributed with the wastewater in the reactor.

Preferably, the reactor includes at least one treating case, and wherein the treating units are contained in the treating case.

Preferably, the treating case and the membrane module in the reactor are arranged in series.

BRIEF DESCRIPTION OF THE DRAWINGS

The above objects and advantages of the present invention will become more readily apparent to those ordinarily skilled in the art after reviewing the following detailed descriptions and accompanying drawings, in which:

FIG. 3A and FIG. 3B are schematic views showing the wastewater treatment apparatus according to a preferred embodiment of the present invention;

FIG. 5 is a schematic view showing the wastewater treatment apparatus according to a further preferred embodiment of the present invention;

DETAILED DESCRIPTION OF THE PREFERRED EMBODIMENT

Figure 1:
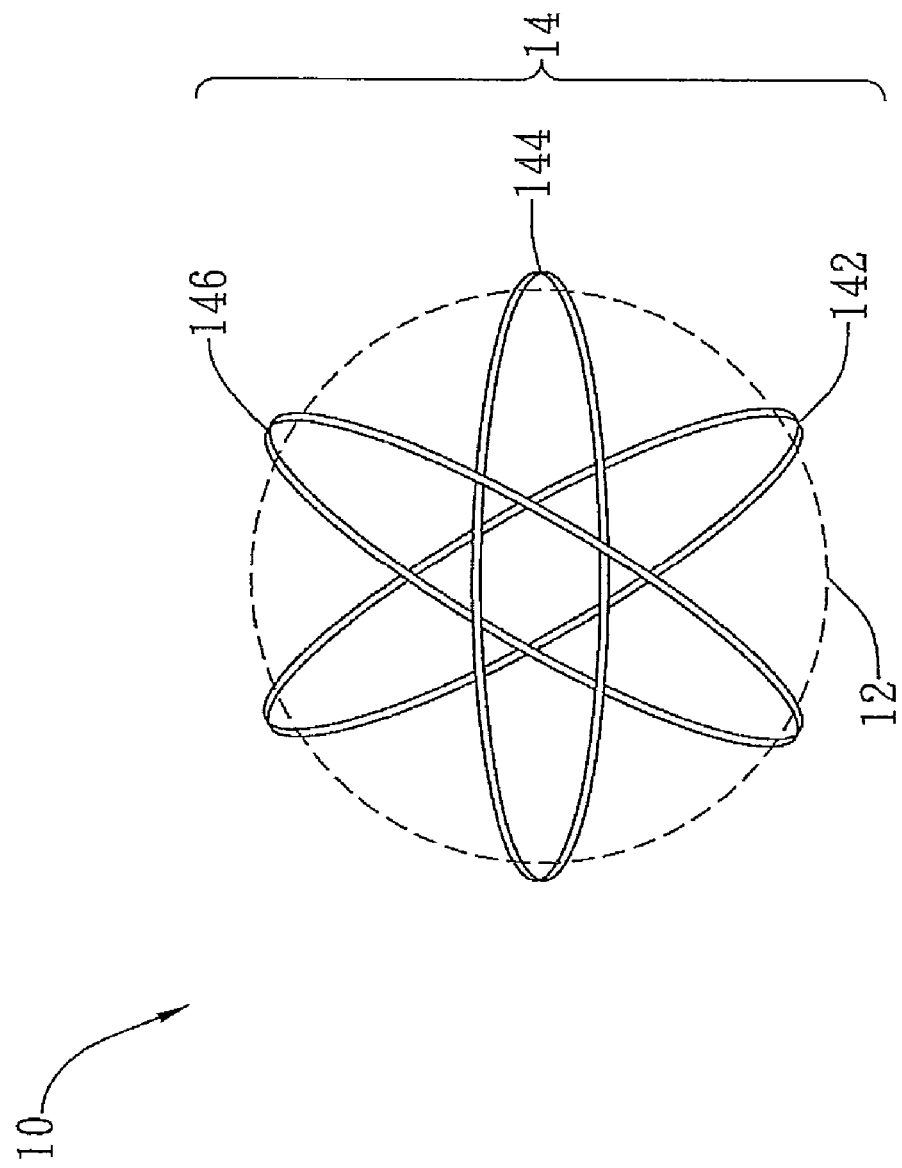
FIG. 1 is a schematic view showing the treating unit for wastewater according to a preferred embodiment of the present invention.

With reference to the following disclosures combined with the accompanying drawings, the treating unit and apparatus having the same according to the present invention are illustrated and understood. It should be noted that the elements shown in the drawings are merely provided for illustration, but not limitation to the present invention, and the elements known by the skilled person in this art are omitted from the drawings for clarity.

Please refer to FIG. 1, which schematically shows the treating unit for wastewater according to a preferred embodiment of the present invention. The treating unit 10 is constructed by a microbial cell 12 and a supporting device 14. According to the present invention, the microbial cell 12 is composed of conditioned activated sludge, while the supporting device 14 is a supporting cage having an interior space defined therein. The microbial cell 12 is contained in the interior space, and is retained therein with the aid of supporting cage of the supporting device 14. In a specific embodiment, the supporting device 14 is a sphere-shaped cage constructed by three rings 142, 144 and 146 that are located on different planes and intersecting with one another. The three rings 142, 144 and 146 are made of thermoplastic material such as polyethylene (PE), and are adhered and fixed with one another by means of thermal melting. According to the present invention, the inner diameter of the respective rings is ranged from 5 mm to 30 mm, and is preferably 25 mm, 16 mm or 10 mm.

Figure 2:
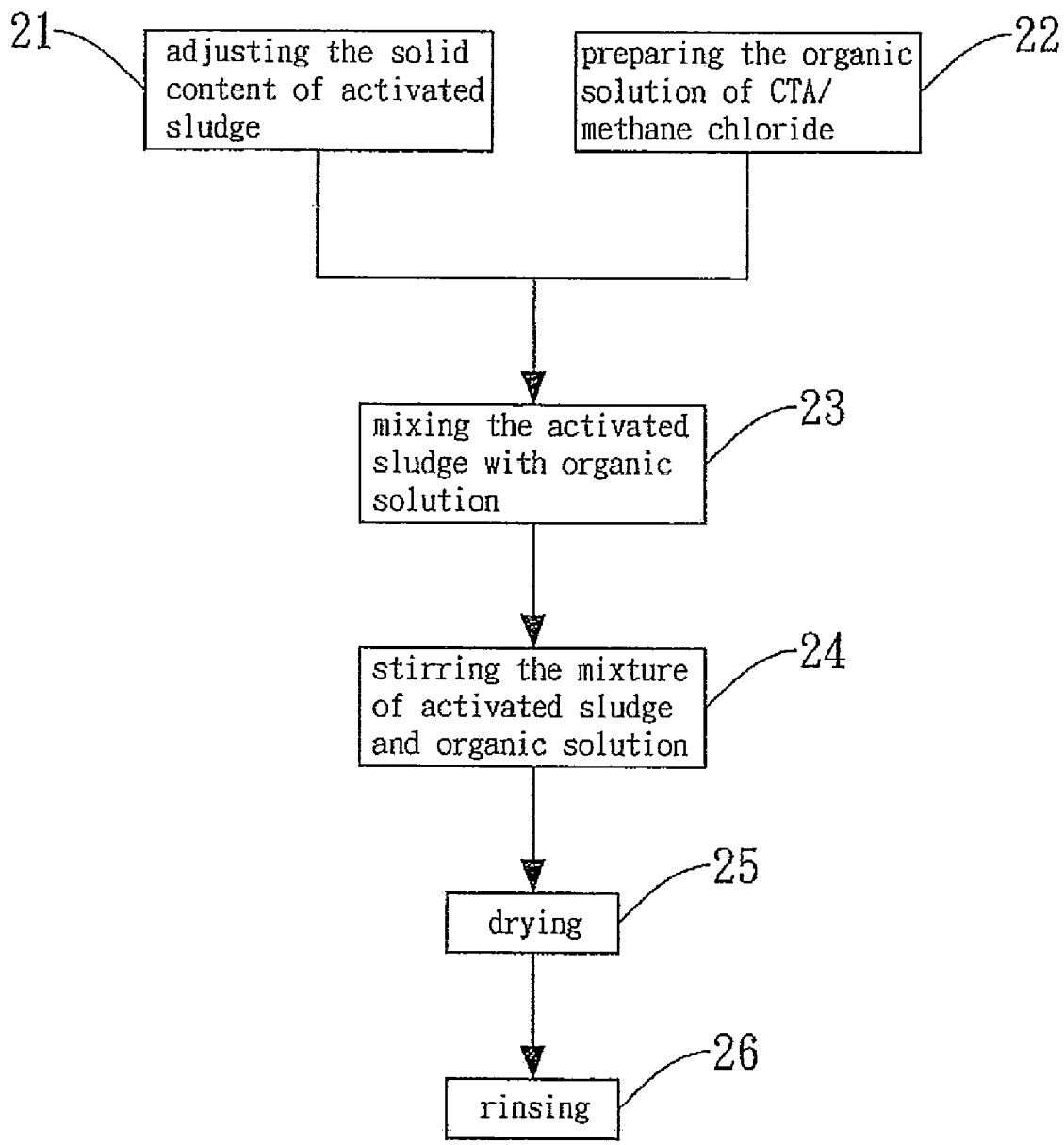
FIG. 2 is a flowchart illustrating the procedures for fabricating the treating unit for wastewater according to the preferred embodiment of the present invention.

In the preferred embodiment of the present invention, the microbial cell is prepared from the acclimated and conditioned activated sludge, obtained from the bottom of secondary settling tank of an actual wastewater treatment plant, by using the procedures as shown in FIG. 2. The prepared microbial cells are contained and supported by respective supporting devices, whereby the treating units for wastewater according to the present invention are fabricated.

In step 21, the solid content of activated sludge obtained from the bottom of settling tank is adjusted, by means of decanter centrifuge, to a value ranged from 10% to 20%. According to a preferred embodiment of the present invention, cellulose triacetate (CTA), a water-permeable polymer, is used as a gel material to confine the migration of microorganism as a microbial cell. In step 22, an organic solution containing 100 gram of CTA dissolved in 1 L of methylene chloride is prepared, and is stirred by stir bars for 4~5 hours. In such case, the concentration of the prepared CTA/methylene chloride organic solution is 10% (v/w), and the amount thereof is sufficient for confining 1000 gram of activated sludge. It is appreciated for the skilled person in this art that the respective amounts of methylene chloride and CTA are variable, depending upon amount of activated sludge to be confined.

Subsequently, a mixture of 100 mL of CTA/methylene chloride organic solution and 100 gram of activated sludge having a solid content of 10%~20% is prepared in step 23. In step 24, the mixture is stirred to become gelled, and is contained in an interior space of respective supporting devices. Stirring of the mixture is carried out until the respective supporting device is fully filled with the mixture to form the microbial cell of treating unit of the present invention. In step 25, the prepared microbial cells are immersed with toluene for 5~10 seconds and then air-dried in atmosphere. In step 26, the respective microbial cells are rinsed with water, to remove the toluene residual therefrom, so that the treating units according to the present invention are fabricated.

In accordance with a preferred embodiment of the present invention, the supporting device is a supporting cage constructed by three polyethylene (PE) rings that are intersecting with one another. Accordingly, the size of treating unit of the present invention is determined by the inner diameter of PE ring. Preferably, the inner diameter of PE ring of the present invention is ranged from 5 mm to 30 mm. As the inner diameter of PE ring reduces, the size of the supporting cage constructed by the PE rings reduces correspondingly, and thus the microbial cell contained therein is relatively dense. That is, treating units of different sizes can be prepared by selecting PE rings of different inner diameters, which actually depends upon the condition of wastewater to be treated.

In a specific embodiment of the present invention, the supporting cage of treating unit is constructed by three PE rings in such a way that the supporting cage containing the microbial cell therein will be sphere-shaped. Nevertheless, it should be appreciated that the amounts and material of rings to construct the supporting cage are variable. It is possible to use rings made of other plastic materials, ceramic materials, or even metals to construct the supporting device. Furthermore, the use of biodegradable materials such as green plastic to construct the supporting device is also possible, which is advantageous for subsequent waste treatment of the treating units.

With reference to FIGS. 3A and 3B, the wastewater treatment apparatus in accordance with a preferred embodiment of the present invention is schematically illustrated. As shown in FIG. 3A, the wastewater treatment apparatus 30 includes at least a columnar reactor 32 in which plural treating units 34 (shown in FIG. 3B) as illustrated above are filled to remove the organics, i.e. carbon compounds, and nitrogen compounds from wastewater. For example, but not limitation, the wastewater treatment apparatus 30 is an aeration basin having at least one fixing frame 36 disposed therein, so that the columnar reactor 32 of the present invention is fixed therewith. The wastewater is fed into the aeration basin through the inlet 382, and drains therefrom through the outlet 384 after proceeding with the removal of organics and nitrogen compounds within the basin.

Figure 4B:
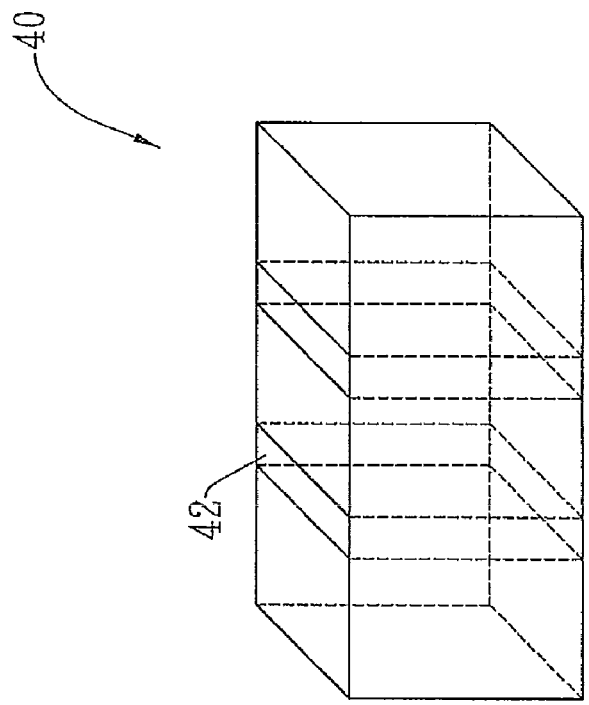
FIG. 4A and FIG. 4B are schematic views showing the wastewater treatment apparatus according to another preferred embodiment of the present invention.
Figure 4A:
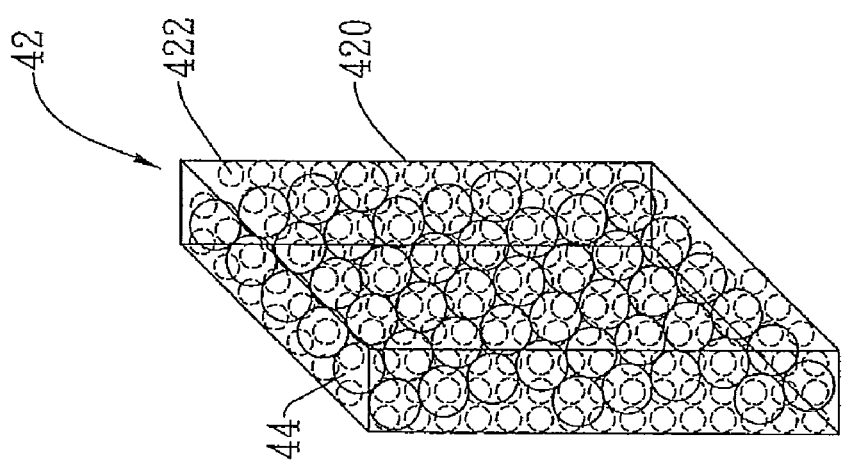

With reference to FIGS. 4A and 4B, the wastewater treatment apparatus in accordance with a further preferred embodiment of the present invention is schematically illustrated. As shown in FIG. 4A, the wastewater treatment apparatus 40 includes a perforated cassette-shaped reactor 42 in which a plurality of treating units 44 (shown in FIG. 4B) as mentioned are filled to remove the organics and nitrogen compounds from the wastewater. Similarly, the wastewater treatment apparatus 40 is, for example but not limitation, an aeration basin, in which a plurality of perforated cassette reactors 42, spaced apart from each other with a predetermined distance, are arranged. Such design enables the improvement in replacing and maintaining of the treating units.

According to the present application, the treating units are arranged in the reactor or basin with an adjustable filling ratio, which is adjusted depending upon actual desires. For example, the filling amount of 0.3 cm$^3$ for a basin volume of 1 cm$^3$ indicates that the volume filling ratio is substantially 30%. Moreover, the treating units are filled within the basin in a densely-stacking manner as shown in FIGS. 3A and 4A. Alternatively, the treating units may be filled within the basin in a non-densely stacking manner where the so that the basin may function as a fluidized bed reactor. In this case, the collision among treating units and thus the damage thereof can be avoided, as shown in FIG. 5.

Figure 6:
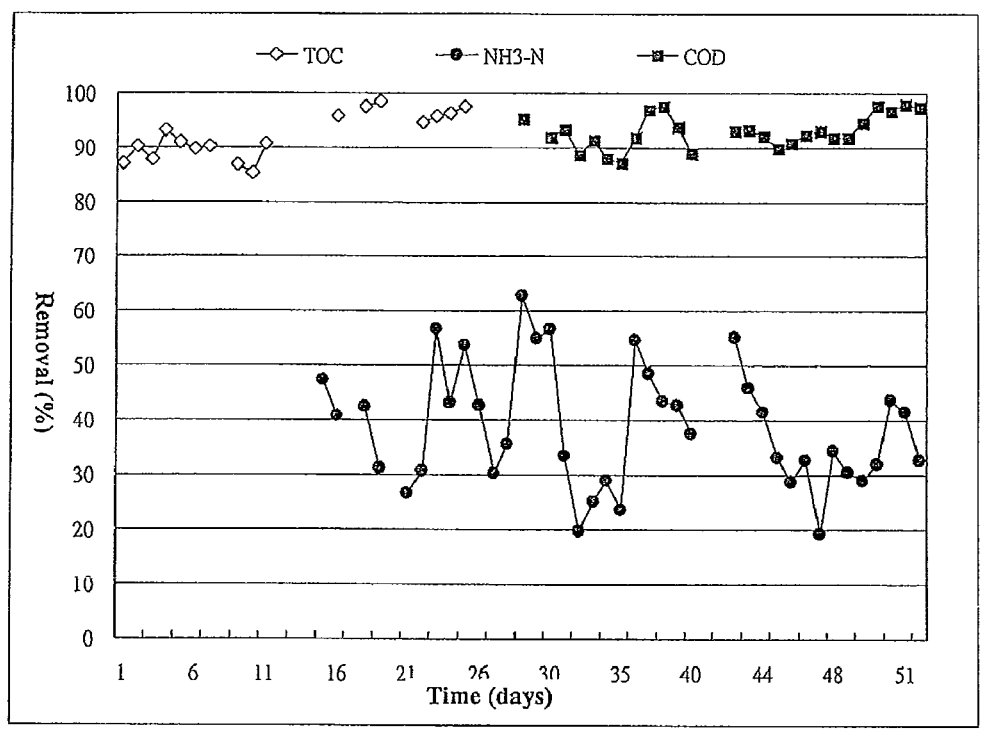
FIG. 6 shows the treating efficiency for synthesized influent with the columnar reactor according to the present invention.

FIG. 6 shows the treating efficiency for synthesized influent with the columnar reactor according to the present invention, where the amount of total organic carbon (TOC), ammonia nitrogen ($NH_3$—N) and chemical oxygen demand (COD) of influent and effluent are measured, respectively. In this case, the inner diameter of the supporting device of treating units contained in the columnar reactor is 25 mm, and the volume filling ratio thereof is substantially 30%, i.e. a filling amount of 0.3 cm$^3$ for a basin volume of 1 cm$^3$. The hydraulic retention time (HRT) is adjustable between 6 and 24 hours, depending upon the condition of influent to be treated. An air flow of 1 L/min per liter of reactor volume is provided to the columnar reactor. The measurement results show that the start-up period of the columnar reactor according to the present invention, during which a stable operation is achievable, is extremely short, and the removal efficiency of TOC and COD is above 95%. The columnar reactor also provides significantly improved removal of $NH_3$—N, though the efficiency thereof may be varied with the aeration condition of reactor. For example, a removal efficiency of 55% is achieved by the present invention while the amount of nitrate nitrogen ($NO_3$—N) contained in the effluent is less than 0.1 mg/L.

Figure 7:
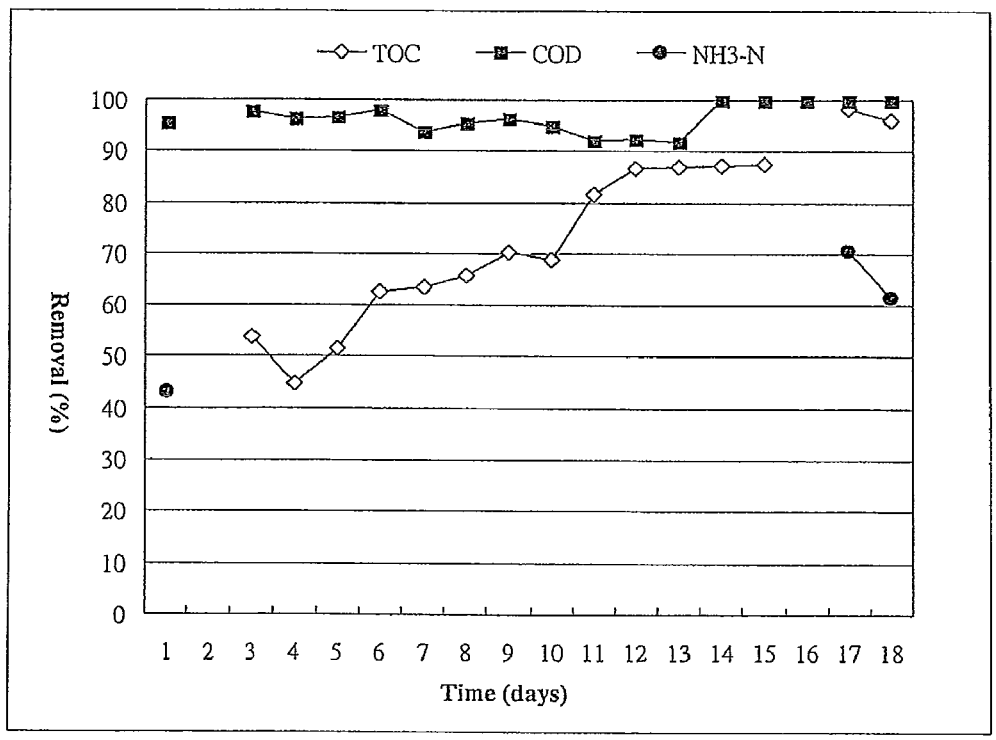
FIG. 7 shows the treating efficiency for actual wastewater with the columnar reactor according to the present invention.

FIG. 7 shows the treating efficiency for actual wastewater with the columnar reactor according to the present invention where the amount of total organic carbon (TOC), ammonia nitrogen ($NH_3$—N) and chemical oxygen demand (COD) of influent and effluent are respectively measured. In this case, the inner diameter of supporting device of treating units contained in the columnar reactor is 16 mm, and the volume filling ratio thereof is substantially 30%, i.e. a filling amount of 0.3 cm$^3$ for a basin volume of 1 cm$^3$. The hydraulic retention time (HRT) is adjustable between 6 and 24 hours, depending upon the condition of influent to be treated. An air flow of 1 L/min per liter of reactor volume is provided to the columnar reactor. The measurement results show that a stable operation of columnar reactor according to the present invention is achieved. The removal efficiency of COD almost achieves 100%, and the removal efficiency of TOC approaches 90%. When the columnar reactor stably operates, e.g. after an operation period of 17 days, the removal efficiency of $NH_3$—N up to 70% is achieved while the amount of $NO_3$—N contained in the effluent is less than 0.1 mg/L.

Figure 8:
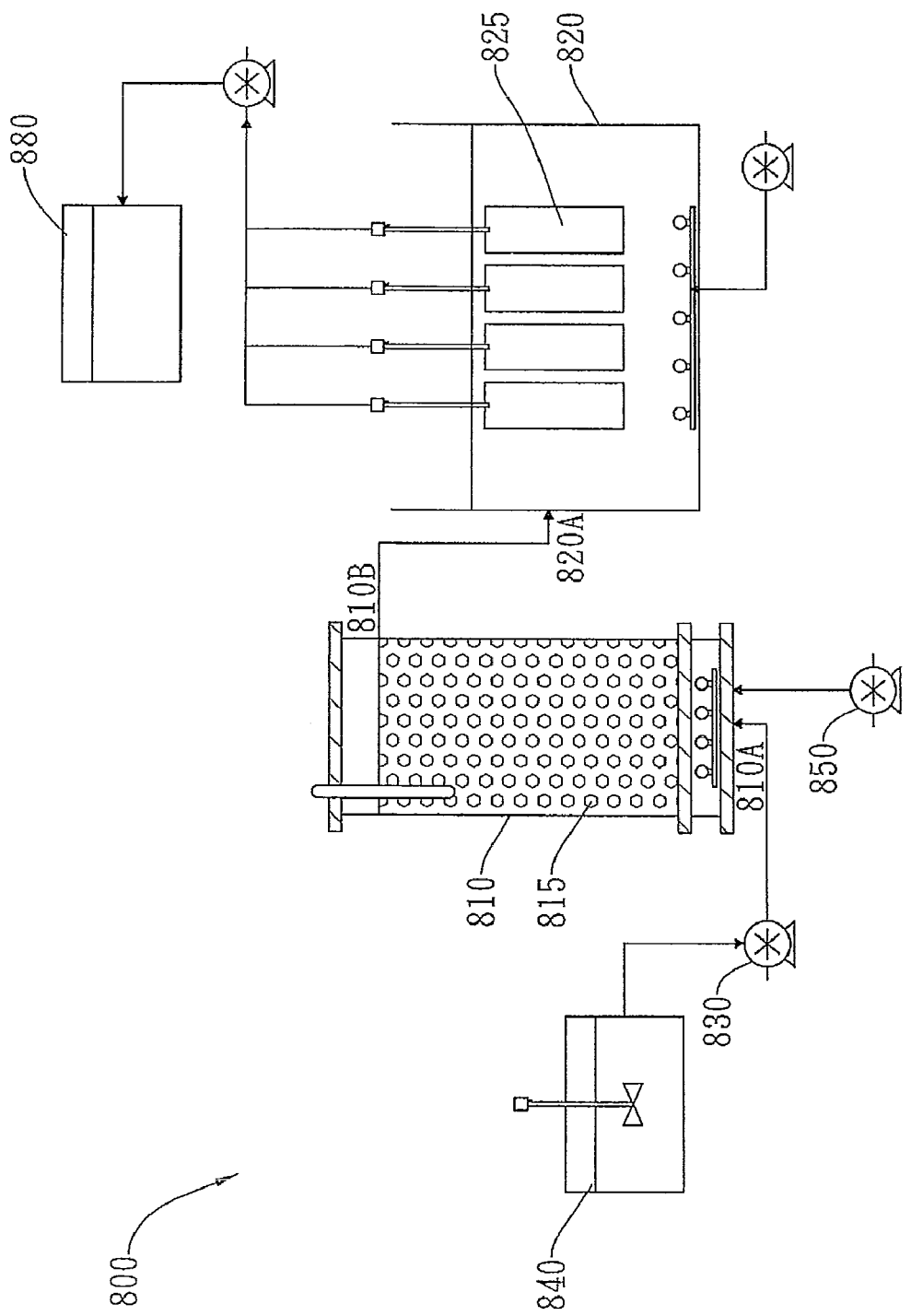
FIG. 8 is a schematic view showing the wastewater treatment system with the membrane module according to one preferred embodiment of the present invention.

Please refer to FIG. 8, which is a schematic view showing the wastewater treatment system with the membrane module according to one preferred embodiment of the present invention. The wastewater treatment system 800 is constructed by a biological reactor 810 and a membrane reactor 820 fluidly connected thereto. The biological reactor 810 contains plural treating units 815 therein, while the membrane reactor 820 includes at least one membrane module 825 arranged therein. According to the present invention, each of the treating units 815 is sphere-shaped and formed by a supporting cage and a microbial cell contained therein, as shown in FIG. 1.

As shown in FIG. 8, the wastewater to be treated is pumped from the influent reservoir 840 into the biological reactor 810 with the aid of pump 830. According to the preferred embodiment, the biological reactor 830 is a columnar reactor in which plural treating units 815 are contained. The wastewater to be treated is directed into the reactor through the inlet 810A at the bottom, and is discharged through the outlet 810B at the top of reactor after the removal of organics and nitrogen compounds is carried out.

According to the present invention, the inlet 810B of the biological reactor 810 is fluidly connected with the inlet 820A of the membrane reactor 820. That is, the wastewater being treated to remove the nitrogen compounds and organics therefrom is directed into the membrane reactor 820 from the biological reactor 810 through the inlet 820A, so that the suspended solids contained therein is filtered with the membrane modules 825 arranged in membrane reactor 820. The filtered permeate is pumped from the membrane reactor 820 to the effluent reservoir 880, so as to obtain the clear discharge.

According to the present invention, the filling ratio of treating units 815 with respect to the biological reactor 810 is adjustable, depending upon the actual demand for treatment. Moreover, with the aid of compressor or blower 850 and air regulator (not shown), the air flow supplied to the biological reactor 810 is adjustable, so as to control the dissolved oxygen (DO) condition for the reactor. The increase of air flow also helps to completely mixing the treating units 815 with the wastewater inside the biological reactor 810.

Figure 9:
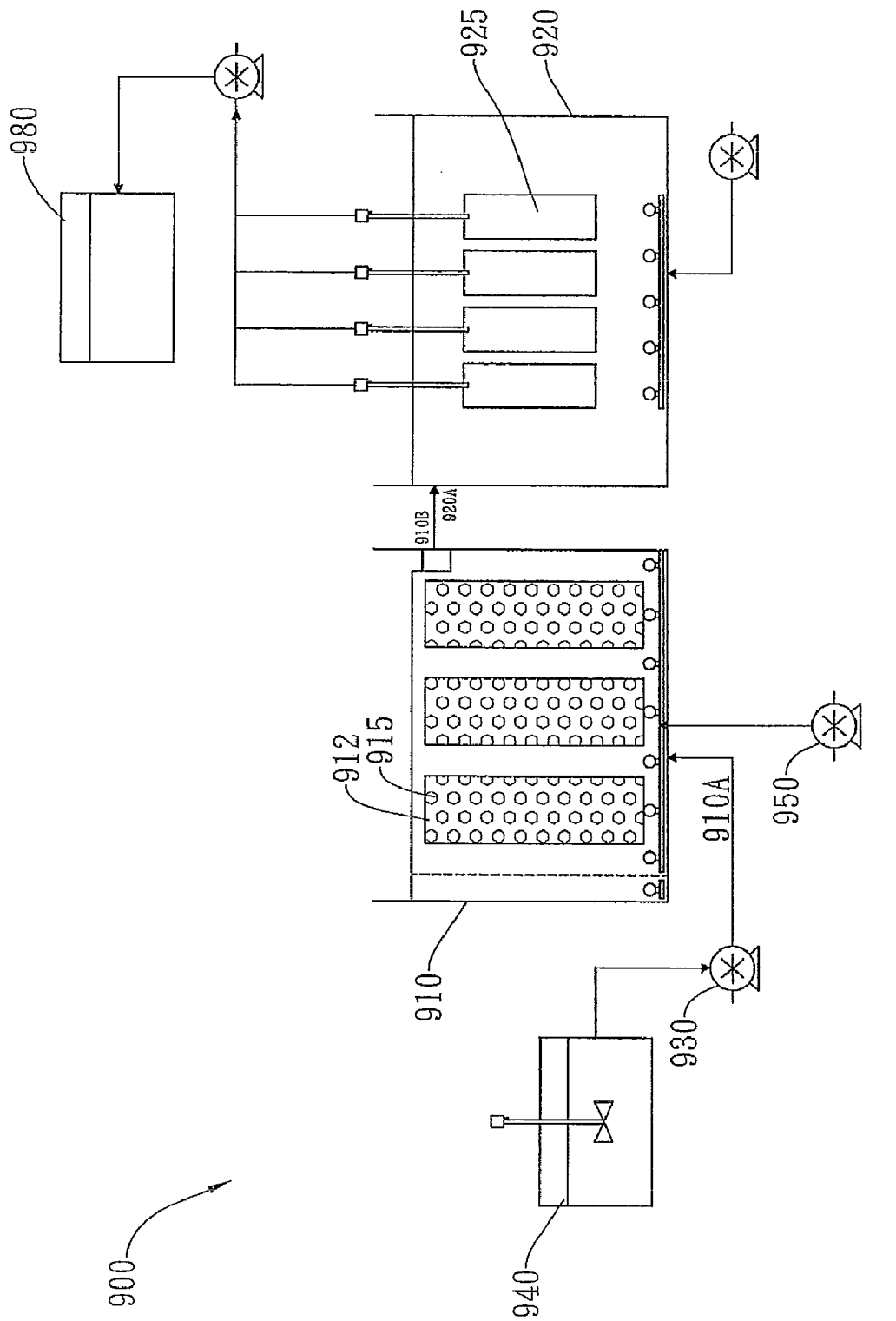
FIG. 9 is a schematic view showing the wastewater treatment system with the membrane module according to another preferred embodiment of the present invention.

Please refer to FIG. 9, which is a schematic view showing the wastewater treatment system with the membrane module according to another preferred embodiment of the present invention. The wastewater treatment system 900 is constructed by a biological reactor 910 and a membrane reactor 920 fluidly connected thereto. In this embodiment, the biological reactor 930 is a rectangular reactor in which at least one treating cassette 912 is arranged. That is, the plurality of treating units 915 are filled within the treating cassette 912, which is arranged in the rectangular reactor for the removal of organics and nitrogen compounds from wastewater. The membrane reactor 920 includes at least one membrane module 925 arranged therein. According to the present invention, each of the treating units 915 is sphere-shaped and formed by a supporting cage and a microbial cell contained therein, as shown in FIG. 1.

As shown in FIG. 9, the wastewater to be treated is pumped from the influent reservoir 940 into the biological reactor 910 with the aid of pump 930. The wastewater to be treated is directed into the reactor through the inlet 910A at the bottom, and is discharged through the outlet 910B at the top of reactor after the removal of organics and nitrogen compounds is carried out.

According to the present invention, the inlet 910B of the biological reactor 910 is fluidly connected with the inlet 920A of the membrane reactor 920. That is, the wastewater being treated to remove the nitrogen compounds and organics therefrom is directed into the membrane reactor 920 from the biological reactor 810 through the inlet 920A, so that the suspended solids contained therein is filtered with the membrane modules 925 arranged in membrane reactor 920. The filtered permeate is pumped from the membrane reactor 920 to the effluent reservoir 980, so as to obtain the clear discharge.

Similarly, the filling ratio of treating units 915 with respect to the biological reactor 910 is adjustable, depending upon the actual demand for treatment. Moreover, with the aid of compressor or blower 950 and air regulator (not shown), the air flow supplied to the biological reactor 910 is adjustable, so as to control the DO condition for the reactor. The increase of air flow also helps to completely mixing the treating units 915 with the wastewater inside the biological reactor 910.

Figure 10:
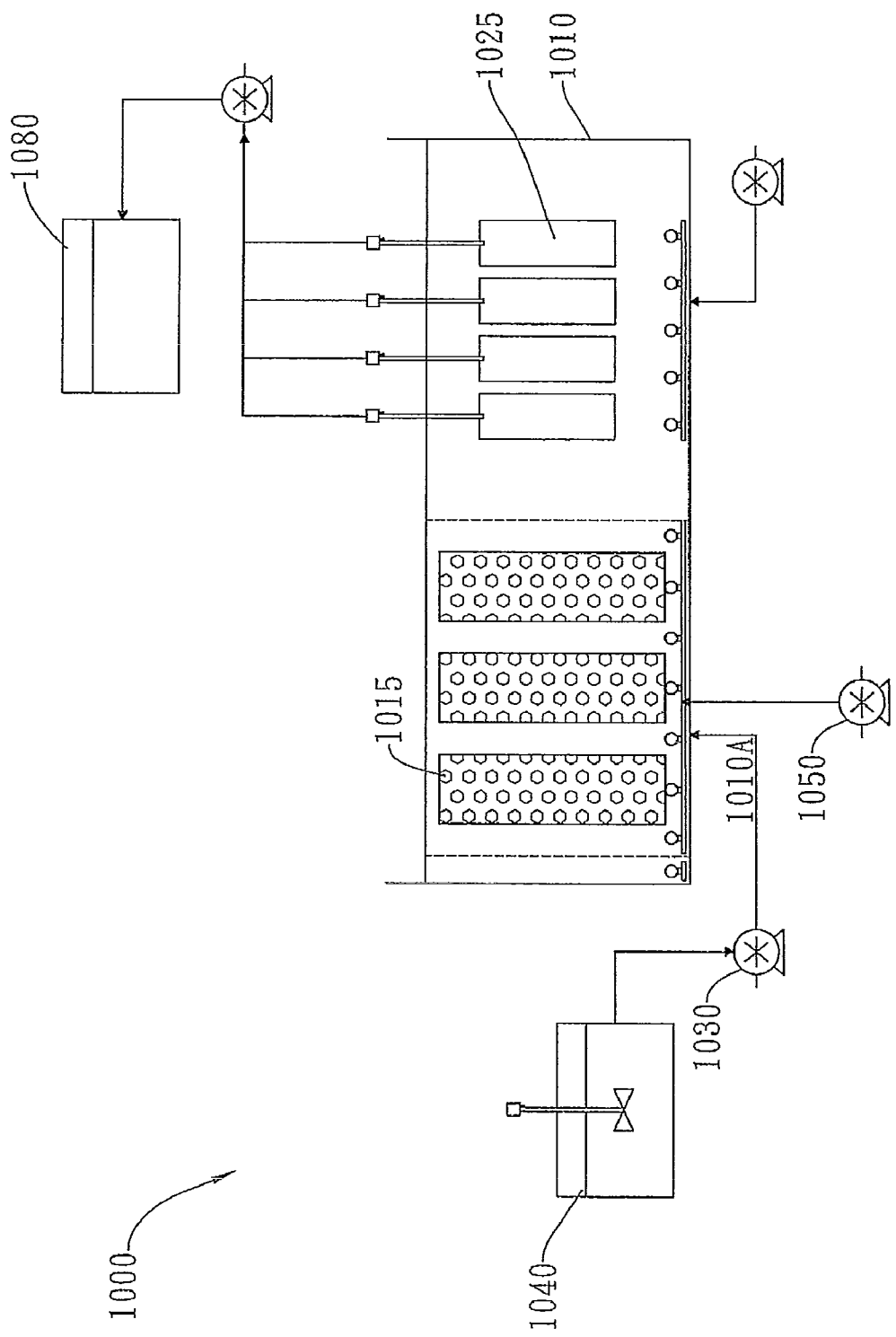
FIG. 10 is a schematic view showing the wastewater treatment system with the membrane module according to one another preferred embodiment of the present invention.

Please refer to FIG. 10, which is a schematic view showing the wastewater treatment system with the membrane module according to one another preferred embodiment of the present invention. In this embodiment, the wastewater treatment system 1000 is constructed by a hybrid reactor 1010 in which at least one treating perforated cassette containing plural treating units 1015 is arranged for the removal of organics and nitrogen compounds from wastewater. In addition to the treating perforated cassette containing the treating units 1015, the reactor 1010 is also provided with at least one membrane module 1025 which is dipped in the wastewater for the filtration of suspended solids. According to the present invention, each of the treating units 1015 is sphere-shaped and formed by a supporting cage and a microbial cell contained therein, as shown in FIG. 1.

As shown in FIG. 10, the wastewater to be treated is pumped from the influent reservoir 1040 into the hybrid reactor 1010 with the aid of pump 1030. The wastewater to be treated is directed into the hybrid reactor 1010 through the inlet 1010A thereof. The removal of organics and nitrogen compounds from the wastewater is carried out in the hybrid reactor 1010 by the treating units 1015, and moreover, the suspended solids contained in the wastewater are filtered by means of the membrane module 1025 arranged therein. The permeate flow is pumped from the hybrid reactor 1010 to effluent reservoir 1080, so as to obtain the clear discharge.

Similarly, with the aid of compressor or blower 1050 and air regulator (not shown), the air flow supplied to the reactor 1010 is adjustable, so as to control the DO condition for the reactor. The increase of air flow also helps to cause the wastewater to form a completely mixed flow or plug flow inside the hybrid reactor 1010.

Figure 11:
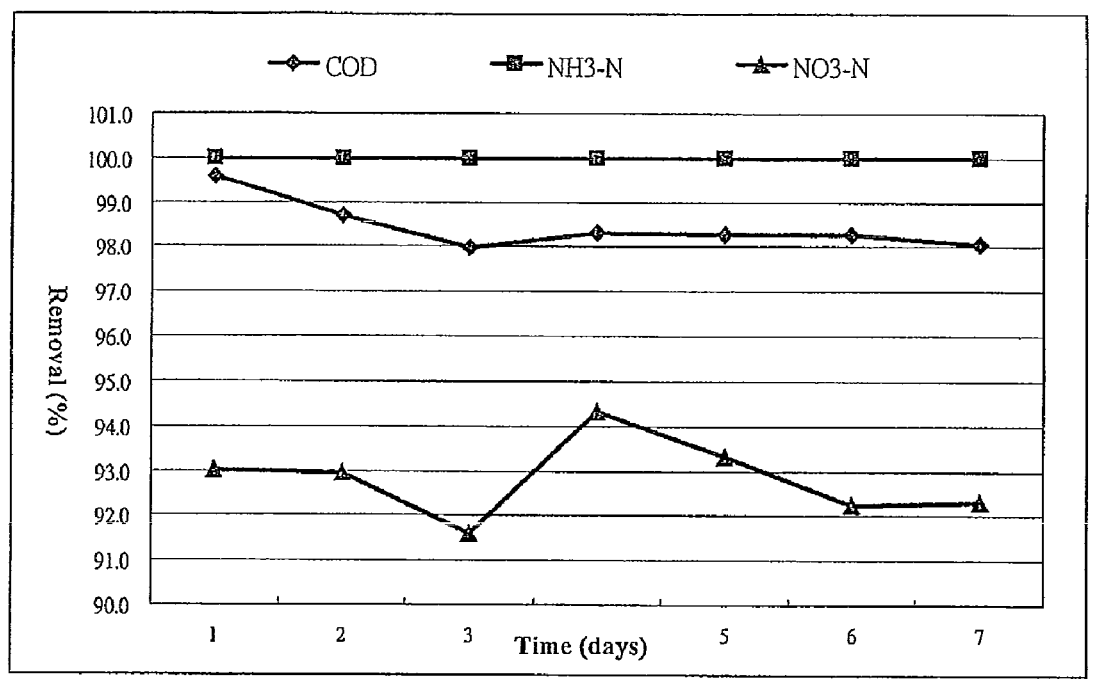
FIG. 11 shows the treating efficiency for synthesized influent with the wastewater treatment system with the membrane module according to the present invention.
Figure 12:
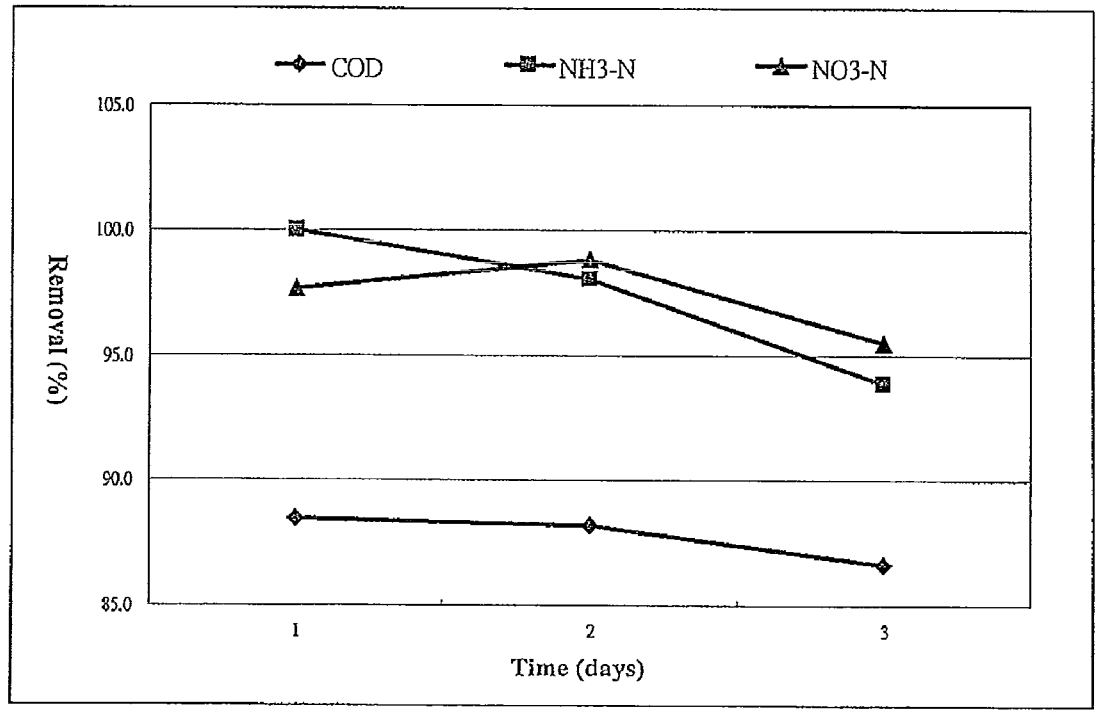
FIG. 12 shows the permeate flux for synthesized influent with the wastewater treatment system with the membrane module according to the present invention.
Figure 13:
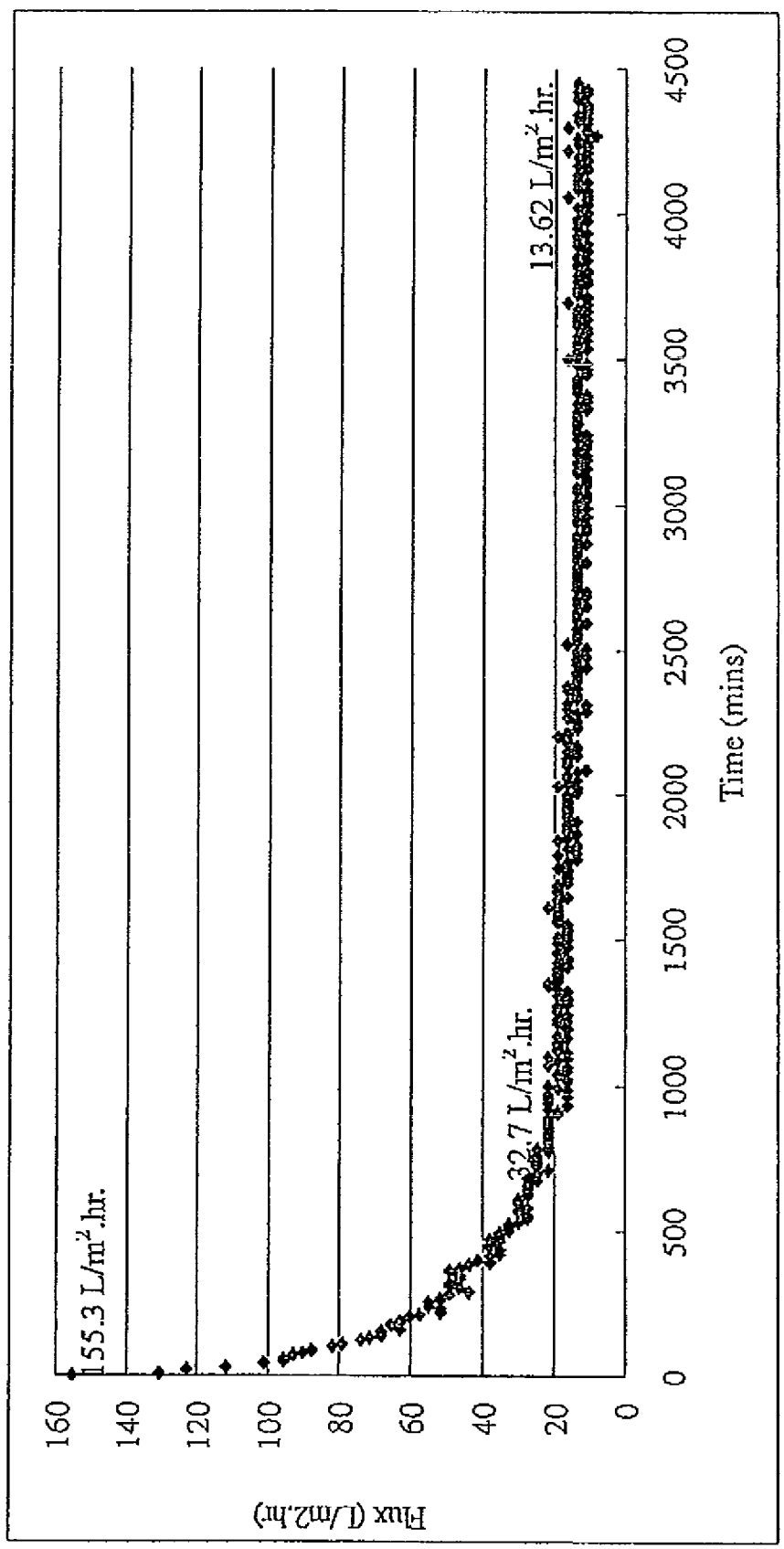
FIG. 13 shows the treating efficiency for actual wastewater with the wastewater treatment system with the membrane module according to the present invention.

There are a variety of membrane modules capable of being employed in the wastewater treatment system according to the present invention. For example, but not limitation, FIGS. 11 and 12 show the treating efficiency for synthesized influent and for the actual wastewater with the wastewater treatment system employing a membrane module of MF hollow fiber according to the present invention, respectively. The pore size of such membrane is 100 kDa, i.e. 0.01 μm.

FIG. 6 demonstrates the respective removal efficiency of COD, $NH_3$—N and $NO_3$—N for the synthesized influent. In this case, the treating units having a size of 25 mm are adopted in the wastewater treatment system and the filling ratio thereof is substantially 30%. The hydraulic retention time is adjusted to 12 hours, and an air flow of 1 L/min for per liter of reactor volume is supplied. The air flow is supplied for one hour with a two-hour suspending (indicated by 1:2). The measurement results show that the start-up period of the wastewater treatment system according to the present invention, during which a stable operation is achievable, is extremely short, and the removal efficiency of COD and $NO_3$—N is above 90%, and furthermore, a removal efficiency of ammonia nitrogen of 100% is achievable by the present invention.

FIG. 7 demonstrates the respective removal efficiency of COD, $NH_3$—N and $NO_3$—N for the actual wastewater. In this case, the treating units having a size of 25 mm are adopted for treating the food industrial wastewater and the filling ratio thereof is substantially 30%. The hydraulic retention time is adjusted to 12 hours, and an air flow of 1 L/min for per liter of reactor volume is supplied. The air flow is supplied for one hour with a two-hour suspending (indicated by 1:2). The measurement results show that the start-up period of the wastewater treatment system according to the present invention, during which a stable operation is achievable, is extremely short, and the removal efficiency of COD and $NO_3$—N is above 85%, and furthermore, a high removal efficiency of ammonia nitrogen above 95% is achieved by the present invention.

In addition to the improved treating efficiency as mentioned, the wastewater treatment system according to the present invention also provides excellent filtration efficiency with respect to the suspended solids. In a preferred embodiment of the present invention, with the treatment by the provided system, an effluent containing no suspended solids is obtained from an influent whose concentration of suspended solids is up to 10~15 mg/L, and a permeate flux up to 14~32 $L/m^2/hr$ is achieved as well, as the measurement results shown in FIG. 8 demonstrates. Furthermore, since the microbial cell is contained within the supporting cage, the peeling-off of the aggregation can be avoided. By the present invention, the sludge age of activated sludge of treating units is increased to several tens to hundreds days, which significantly improves the treating efficiency for the pollutant in the water and reduces the amount of excess sludge. Therefore, the problem of waste sludge treatment and disposal is addressed.

Moreover, the wastewater treatment system according to the present invention is easy to operate, which is cost-efficient and toxicity-tolerant. The present wastewater treatment system is capable of removing the organics and nitrogen compounds from the wastewater under a controlled aeration mode, and enhancing the efficiency of membrane treatment. The expense for membrane module is thus reduced.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present invention which is defined by the appended claims.

What is claimed is:

1. A treating unit for simultaneously removing organics and nitrogen compounds from wastewater, comprising:
    a microbial cell comprising conditioned activated sludge; and
    a supporting device constructed by at least two rings located on different planes and having an interior space defined thereby,
    wherein said conditioned activated sludge is confined with a gel material and said microbial cell is contained in said interior space, thereby a simultaneous removal of organics and nitrogen compounds from wastewater being carried out under a controlled aeration mode.

2. The treating unit of claim 1, wherein said microbial cell has a solid content of activated sludge ranged from 10% to 20%.

3. The treating unit of claim 1, wherein each of said rings is made of a thermoplastic material.

4. The treating unit of claim 3, wherein said thermoplastic material comprises polyethylene (PE).

5. The treating unit of claim 1, wherein said supporting device is cage-shaped.

6. The treating unit of claim 1, wherein said supporting device is sphere-shaped.

7. The treating unit of claim 1, wherein said supporting device is constructed by three rings located on different planes.

8. The treating unit of claim 1, wherein said rings are adhered and fixed to each other by means of thermal melting.

9. The treating unit of claim 1, wherein each of said rings has an inner diameter ranged from 5 mm to 30 mm.

10. The treating unit of claim 1, wherein each of said rings has an inner diameter of 25 mm.

11. The treating unit of claim 1, wherein each of said rings has an inner diameter of 16 mm.

12. The treating unit of claim 1, wherein each of said rings has an inner diameter of 10 mm.

13. A biological treatment apparatus for simultaneously removing organics and nitrogen compounds from wastewater, said biological treatment apparatus comprising a biological reactor containing plural treating units filled therein, characterized by that each of said treating units is constructed by a supporting cage and a microbial cell contained in said supporting cage, wherein said microbial cell is composed of an activated sludge confined with a gel material and conditioned to carry out a simultaneous removal of organics and nitrogen compounds from wastewater under a controlled aeration mode.

14. The biological treatment apparatus of claim 13, wherein said supporting cage is constructed by at least two rings located on different planes.

15. The biological treatment apparatus of claim 13, wherein said supporting cage is a sphere-shaped cage constructed by three rings located on different planes.

16. The biological treatment apparatus of claim 13, wherein said biological reactor is one of a columnar reactor, a rectangular reactor and a fluidized bed.

17. A wastewater treatment apparatus comprising:
    a reactor in which a simultaneous removal of organics and nitrogen compounds from wastewater is carried out;
    a plurality of biological treating units filled in said reactor, each of said biological treating units including:
    a supporting device defining an interior space; and
    a microbial cell contained in said interior space, said microbial cell being confined with a gel material and conditioned such that said simultaneous removal of organics and nitrogen compounds from wastewater is carried out under a controlled aeration mode.

18. The wastewater treatment apparatus of claim 17, wherein said reactor has a volume filling ratio of said biological treating units of 30% substantially.

19. A wastewater treatment system comprising:
    a biological reactor having a plurality of treating units therein, each of said treating units being comprised by a microbial cell and supporting cage containing said microbial cell therein wherein said microbial cell is composed of an activated sludge confined with a gel material and conditioned to carry out a simultaneous removal of organics and nitrogen compounds from wastewater under a controlled aeration mode; and a membrane reactor having at least one membrane module therein, wherein said membrane reactor has an inlet fluidly connected to an outlet of said biological reactor.

20. The wastewater treatment system of claim 19, wherein said biological reactor is one of a columnar reactor and a rectangular reactor.

21. The wastewater treatment system of claim 20, wherein said rectangular reactor comprises at least one treating cassette containing said treating units.

22. A treating apparatus for simultaneously removing organics, nitrogen compounds and suspended solids from wastewater, comprising:

a reactor containing the wastewater to be treated therein;

a plurality of treating units distributed in said wastewater within said reactor, each of said treating units being constructed by a microbial cell and a supporting cage containing said microbial cell therein; and at least one membrane module configured in said reactor and dipped in said wastewater for filtering said suspended solids from said wastewater, wherein said microbial cell includes an activated sludge confined with a gel material and conditioned such that said organics and nitrogen compounds are removed from said wastewater by said treating units under a controlled aeration mode.

23. The treating apparatus of claim 22, wherein said treating units are fluidizedly distributed with said wastewater in said reactor.

24. The treating apparatus of claim 22, wherein said reactor comprises at least one treating perforated cassette, and said treating units are contained in said treating perforated cassette.

25. The treating apparatus of claim 24, wherein said at least one treating perforated cassette and said at least one membrane module in said reactor are arranged in series.

* * * * *